United States Patent Office 3,209,790
Patented Oct. 5, 1965

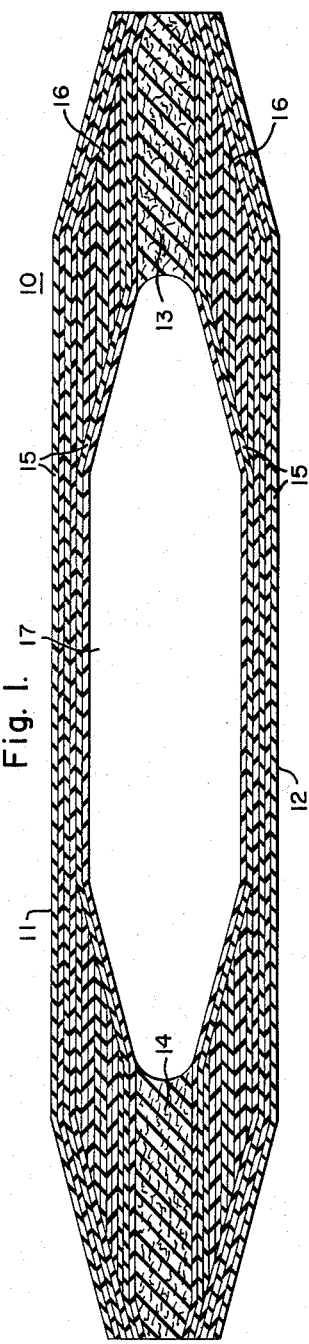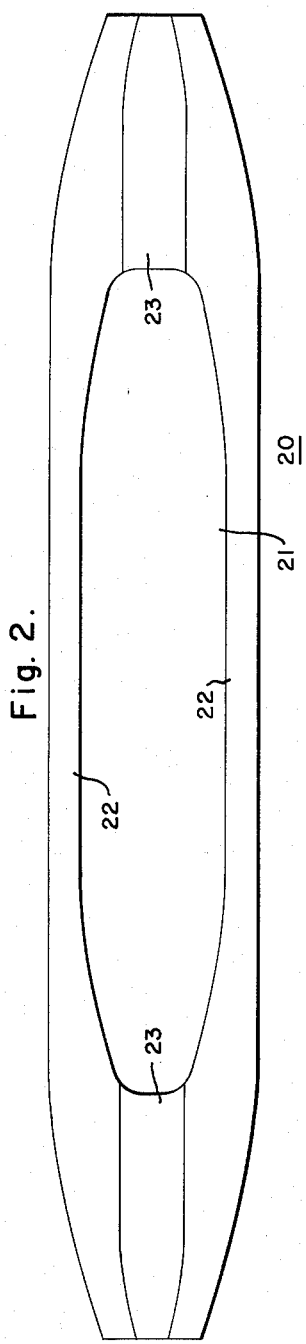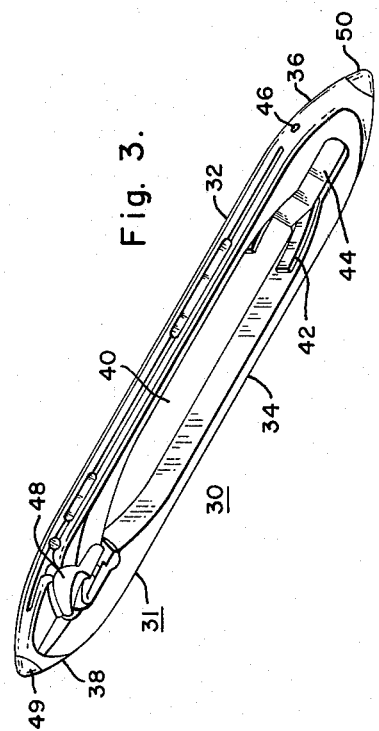

3,209,790
LIGHTWEIGHT PLASTIC SHUTTLE
George M. Naul, Hampton, S.C., assignor to Westinghouse Electric Corporation, Pittsburgh, Pa., a corporation of Pennsylvania
Filed Oct. 31, 1963, Ser. No. 320,416
9 Claims. (Cl. 139—196)

This invention relates to shuttles for fabric weaving looms and particularly to shuttle bodies prepared from molded resinous blanks incorporating unique reinforcing materials.

During the operation of a weaving loom, a shuttle is subjected to considerable stress, strain and impact. The shuttle, and of course the shuttle body from which the shuttles are prepared, must be constructed to provide satisfactory service for prolonged periods of time, in the order of one year or longer.

The traditional shuttle was fabricated from dogwood. Recently, a molded phenolic-cotton reinforced shuttle has been generally accepted in the textile industry as having a longer life than the traditional dogwood shuttle. The physical properties of the molded phenolic-cotton reinforced shuttle are such that these shuttles withstand the stress, strain and impact during operation. However, the mass of the molded phenolic-cotton shuttle is greater than a dogwood shuttle and the power required to drive the molded shuttle is accordingly increased.

Shuttle configurations have been established and the dimensions essentially fixed so that a reduction in the weight of a shuttle can be effected only by a change in the overall density of the structure. Reductions in the density of the structure, however, are limited by the required strength characteristics for prolonged service.

Accordingly, it is an object of this invention to provide a molded laminated resinous shuttle body with a relatively low density and high strength characteristics for prolonged service.

Another object of this invention is to provide a molded laminated resinous shuttle body reinforced with a combination of materials to provide a structure of relatively low mass suitable for prolonged service.

Yet another object of this invention is to provide a combination of reinforcing materials which together with resinous binding materials will produce molded or laminated structures having a relatively low mass and relatively high flexural and impact strength.

Other objects of this invention will, in part, be obvious and will, in part, appear hereinafter.

Briefly, the present invention accomplishes the above cited objects by providing a molded resinous structure reinforced by a fibrous combination of cotton and polypropylene. By employing a laminated preform and a macerated preform, each preform being resin impregnated and containing the combination fibrous reinforcement, a relatively low density or low specific gravity molded shuttle blank may be fabricated. The shuttle bodies prepared from these blanks may be employed in looms for prolonged periods.

For a better understanding of the invention, reference may be had to the accompanying drawing, in which:

FIGURE 1 is a cross-sectional view of a molded shuttle blank;

FIGURE 2 is a plan view of a molded shuttle blank; and

FIGURE 3 is a perspective view of a finished shuttle.

The specific gravity of shuttles manufactured from blanks produced by molding resin impregnated cotton fabric is in the range of about 1.33 to 1.35. These shuttles are superior to the traditional wooden shuttles and have served continuously for periods three times as long as wooden shuttles with considerably less maintenance. They have, however, a higher specific gravity than the traditional wooden shuttles. More power is required to drive them as compared to the power required for the wooden shuttles.

It has now been discovered that shuttles having a specific gravity of about 1.20 and as low as 1.15 may be made with substantially the same physical properties and service life of the described molded laminated shuttle and indeed with an improvement in some properties. The fabric filler or reinforcement is a combination of cotton and polypropylene.

The shuttle blanks are molded from resin impregnated and bonded laminated sheet fibrous polypropylene and cotton and a resinous macerated fabric mixture of polypropylene and cotton.

The fabric filler or reinforcement, in accordance with this invention, must be a combination of about 35 to 50% of polypropylene and from about 65 to 50% of cotton, by weight. This ratio should be maintained for both the laminated sheet and macerated reinforcements. The ratio is based on the resin-free weight of the two fabrics alone, and exclusive of other fillers, pigments and the like, which may be employed with the resin.

Referring now to FIGURE 1 of the drawing, there is illustrated a molded shuttle blank 10 prepared in accordance with this invention. Laminated preforms 11 and 12 are employed for the wall portions of the blank and macerated preforms 13 and 14 are employed for the end portions. Both the laminated and macerated preforms are prepared by methods known in the art from resin-impregnated fabrics, in which the resin is advanced to an intermediate stage and a coherent mass is formed. Heat and pressure are applied to the laminated and macerated preforms in an appropriately shaped mold where the blank is molded to final shape, while the resin is advanced to its fully cured infusible solid state.

Phenolic resins, especially cresylic acid modified phenol-formaldehydes are the preferred resinous binders. Resin ratios of 1.7 to 2.3 for the macerated preforms and 2.0 to 2.8 for the laminated preforms are satisfactory. Resin ratio is the ratio of the weight of the resin or varnish impregnated fabric, either polypropylene or cotton in accordance with this invention, to the weight of the untreated or unimpregnated fabric. Other thermosetting resins having the desirable and required properties of hardness, ruggedness and durability may be substituted for the phenolic resin. Among the examples of such resins are the melamine aldehydes, polyepoxides, alkyds and polyesters.

The cotton fabric material may vary in weight from about 3 to 50 ounces per square yard. The polypropylene material may vary from about 5 to 15 ounces per square yard. Of course, the combination reinforcement or fabric filler, in accordance with this invention, requires about 35 to 50% of polypropylene and about 65 to 50% of cotton, by weight. The proper ratio of polypropylene and cotton may be attained by selecting an appropriate weight of each fabric or by using a combination of cotton and polypropylene picks and ends in the same fabric web.

Referring again to FIGURE 1, for the following specific example, a polypropylene fabric having a weight of 6.5 ounces per square yard with a 30/32 warp/fill thread count was treated with a cresylic acid modified phenol-formaldehyde resin to a resin ratio of 2.70. The resin impregnated fabric was heated to remove the solvent and to advance the resin to an intermediate, or B-stage. A unidirectional cotton fabric having a weight of 10 ounces per square yard and an eight ounce per square yard bleached cotton duck were similarly treated to a resin ratio of 2.0.

The side sheets 15 were alternate sheets of the unidirectional cotton fabric and polypropylene fabric. For the makeup of the fan sheets 16, two sheets of the polypropylene fabric were placed between sheets of the cotton duck. On a resin-free basis, the combination fabric reinforcement for the wall portions 11, 12 was 43% polypropylene and 57% cotton. The described combination of side sheets and fan sheets was heated in an RF generator and preformed in a 70 ton press to obtain a coherent mass.

The macerated fabric reinforcement for the end portions 13, 14 was made by combining chopped one-quarter inch squares of a cresylic acid phenol-formaldehyde impregnated polypropylene and cotton fabric in the above described weight ratio. The macerated mixture was preformed in a mold at 142 tons. The macerated preforms were preheated in an RF generator and loaded into a 200 ton press together with the wall preforms and molded to the blank shape at a temperature of 165 to 170° C. The blank was baked for 45 minutes at 165 to 170° C. and cooled.

The molded shuttle blank, made in accordance with the foregoing example of this invention, had a specific gravity of 1.18 as compared to 1.34 for a molded all cotton reinforced shuttle blank. Moreover, although there was some loss in cleavage strength, a significant and surprising increase in impact strength was apparent.

The cresylic acid phenol-formaldehyde resin, employed in the foregoing examples, is prepared by refluxing a mixture of cresylic acid, phenol, formaldehyde, ethylene diamine, ammonia and methanol for about 45 minutes. Temperature is then maintained at about 75° C. until a resin sample is clear and dry to the touch at room temperature. Methanol is added at this point to make the composition sufficiently fluid so it can be applied to the fabric. The initial batch contains cresylic acid, phenol, formaldehyde, ethylene diamine, ammonia and methanol in the following respective percentages, by weight: 40.5, 4.5, 34.0, 0.1, 0.5 and 20.4.

If an excessive shrinkage of the polypropylene fabric is encountered, it may be scoured and framed, i.e. preshrunk or desized, by running through an oven prior to impregnation. It should be noted in FIGURE 1 of the drawing, that the side sheets 15 extend through the entire length of the shuttle blank and that the fan sheets 16 are staggered to provide a tapered end surface. An elongated chamber 17 extends through the shuttle blank.

It should be understood that the shuttle blanks may be individually molded or may be cut from a longer molded tubular member having the appropriate cross-section. FIGURE 2 illustrates a machined shuttle body 20 without hardware. The overall length of the shuttle body is usually from about 12 to 20 inches, the length of the chamber 21 about 6 to 10 inches, the thickness of the wall portion 22 about ¼ to ½ inch. The thickness of the macerated portion is about ¾ to 1 inch. The thickness of the fan sheet portion, not separately identified in FIGURE 2, would be about ½ to ⅞ inch.

Referring now to FIGURE 3, there is illustrated a finished shuttle 30 comprising a shuttle body 31 and appropriate hardware. The shuttle body comprises side members 32 and 34 and tapered end members 36 and 38, the interior surfaces of which define a bobbin chamber 40. The hardware comprises a spring clip 42 for holding a bobbin (not shown) in position, seated in a suitable aperture in the end member 36 and held in place by a cover 44 and bolt 46; a threading block or eye 48 secured in end member 38; and spurs 49 and 50 secured to the end members 36 and 38.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

I claim:

1. A molded resinous body comprising, in combination, a fabric reinforcing material and a solidified resin binder, said fabric being impregnated and bound into a unitary mass by said resin binder, said fabric reinforcing material being a mixture of from about 35 to 50% of a polypropylene fabric and about 65 to 50% of a cotton fabric on a resin-free weight basis.

2. A molded resinous body comprising, in combination, a plurality of stacked fibrous reinforcing sheets and a solidified resin binder, the reinforcing sheets being impregnated with and bound into a unitary mass by said resin, said reinforcing sheets being a mixture of from about 35 to 50% of polypropylene sheets and about 65 to 50% of cotton sheets, by weight on a resin-free basis.

3. A molded resinous body comprising, in conbination, a macerated fibrous reinforcing sheet material and a solidified resin binder, the resin binder impregnating and binding the reinforcing material into a unitary mass, said macerated material being a mixture of from about 35 to 50% of macerated polypropylene fabric and about 65 to 50% of macerated cotton fabric, by weight on a resin-free basis.

4. A molded resinous body comprising, in combination, a fabric reinforcing material and a solidified resin binder, said fabric being impregnated and bound into a unitary mass by said resin binder, said fabric reinforcing material being a combination of polypropylene fabric sheets and cotton fabric sheets in a proportion of from about 35 to 50% of polypropylene and about 65 to 50% of cotton on a resin-free weight basis.

5. A molded shuttle having an elongated body defining a centrally disposed elongated chamber, the body comprising, in combination, a solidified resin binder and a reinforcing fabric, the reinforcing fabric being impregnated and bound into a unitary mass by the resin binder, the reinforcing fabric being a mixture of from about 35 to 50% of polypropylene fabric and about 65 to 50% of cotton fabric, by weight on a resin-free basis.

6. The shuttle of claim 5, in which the resin is a cresylic acid modified phenol-formaldehyde resin.

7. A molded shuttle having an elongated body, the elongated body having spaced side walls and end portions cooperating to define a centrally disposed elongated chamber, said side walls comprising, in combination, a plurality of stacked fibrous sheets and a solidified resin binder, the fibrous sheets being impregnated, bound together and to the end portions by the resin binder, the fibrous sheets being a combination of polypropylene fabric sheets and cotton fabric sheets in a proportion of from about 35 to 50% of polypropylene and about 65 to 50% of cotton, on a resin-free weight basis, said end portions comprising, in combination, a macerated fibrous reinforcement and a solidified resin binder, the resin binder impregnating and binding together the reinforcement and the side walls into a unitary structure, the macerated fibrous reinforcement being a combination of chopped polypropylene fabric sheets and chopped cotton fabric sheets in a proportion of from about 35 to 50% of polypropylene and about 65 to 50% of cotton, by weight on a resin-free basis.

8. The molded shuttle of claim 7 in which the resin is a cresylic acid modified phenol-formaldehyde resin.

9. The molded shuttle of claim 8 in which the resin ratio for the side walls is between 2.0 and 2.8 and the resin ratio for the end portions is between 1.7 and 2.3.

References Cited by the Examiner

UNITED STATES PATENTS

| | | | |
|---|---|---|---|
| 2,905,208 | 9/59 | Goreau | 139—196 |
| 3,013,916 | 12/61 | Boiney et al. | 161—259 |
| 3,015,150 | 1/62 | Fior | 28—1 |

FOREIGN PATENTS 1,188,387  3/59  France.

DONALD W. PARKER, *Primary Examiner.*
MORRIS SUSSMAN, *Examiner.*